2,833,766

6-ALKOXY-5-CYANO-PYRIDAZINES

Jean Druey, Riehen, and Paul Schmidt, Therwil, Switzerland, assignors to Ciba Pharmaceutical Products, Inc., Summit, N. J.

No Drawing. Application May 4, 1955
Serial No. 506,060

Claims priority, application Switzerland May 11, 1954

8 Claims. (Cl. 260—250)

This invention relates to pyridazines, which contain in the 6-position an etherified hydroxyl group or an etherified mercapto group, especially an aliphatic etherified hydroxyl group, and advantageously a lower alkoxy group; and in the 5-position a free or functionally converted carboxyl group, such as an esterified or amidated carboxyl group, but more especially the cyano group. The invention provides more especially pyridazines of the aforesaid kind, which contain in the 3- and 4-positions, lower alkyl groups such as methyl, ethyl, propyl, butyl and the like groups, for example 6-methoxy-5-cyano-3,4-dimethylpyridazine of the formula

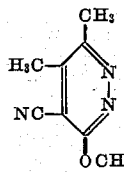

The new compounds possess an analgesic action and are useful as medicaments. Especially valuable as analgesics are the 5-cyano-pyridazines which contain in the 6-position a methoxy group.

The new pyridazines are obtained by converting in a pyridazine, which contains in the 5-position a free or functionally converted carboxyl group and in the 6-position a substituent convertible into an etherified hydroxyl group or etherified mercapto group, the substituent in 6-position into an etherified hydroxyl group or an etherified mercapto group. Such a substituent is, for example, a free hydroxyl or mercapto group or a halogen atom. In general, a free hydroxyl or mercapto group is converted into an etherified hydroxyl or mercapto group, for example, by treatment with reactive esters of alcohols, such as lower alcohols, for instance, dimethyl sulfate or methyl halides, advantageously in the presence of alkaline condensing agents. A halogen atom is converted into an etherified hydroxyl group, for example, by treatment with an alcohol, such as a lower alkanol advantageously in the presence of an alkaline condensing agent. The reactions are carried out advantageously in the presence of an organic solvent.

The 6-hydroxy-pyridazines employed as starting materials can in general be prepared by condensing hydrazine with two components, namely (a) an organic α-dicarbonyl-compound or a reactive functional carbonyl derivative thereof and (b) an organic carboxylic acid of which the carbon grouping in the α-position is a reactive methylene group or a reactive functional derivative of such acid, in optional sequence, i. e., directly or in stages, ring-closure being effected by using a basic condensing agent.

The 6-halogeno-pyridazines employed as starting materials can be prepared by the process set forth in our application Serial No. 506,059, filed on even date herewith, by reacting a 6-hydroxy-pyridazine substituted in 5-position by a free or functionally converted carboxyl group with a halogenating agent such as a phosphorus oxyhalide so as to produce the corresponding 6-halogeno-compound. The 6-mercaptopyridazines are obtained in very good yield by reacting the above-mentioned 6-halogeno-pyridazines with thiourea.

The new analgesically active compounds can be used as medicaments, for example, in the form of pharmaceutical preparations which contain the active substance in admixture with an adjuvant facilitating the administration thereof, for example, a pharmaceutical organic or inorganic carrier suitable for enteral or parenteral administration. As carriers there are used substances which do not react with the new compounds, for example gelatine, lactose, starches, magnesium stearate, talc, vegetable oils, benzyl alcohols, gums, polyalkylene glycols, petroleum jelly, cholesterol or other known carriers for medicaments. The pharmaceutical preparations can be made up, for example, in the form of tablets, dragees, or in liquid form as solutions, suspensions or emulsions. If desired, they may be sterilized and/or may contain auxiliary substances such as preserving, stabilizing, wetting or emulsifying agents or salts for controlling the osmotic pressure or buffers. They may also contain other therapeutically valuable substances. The preparations can be made up by the usual methods employed in pharmaceutical formulation.

The following examples illustrate the invention, the parts being by weight unless otherwise stated, and the relationship of parts by weight to parts by volume being the same as that of the gram to the cubic centimeter:

Example 1

16 parts of 6-chloro-5-cyano-3,4-dimethylpyridazine are introduced into a sodium methylate solution prepared from 2.6 parts of sodium and 150 parts by volume of methyl alcohol, and the whole is stirred for 3 hours at room temperature. The reaction solution is then evaporated to dryness in vacuo, the residue is taken up in 100 parts by volume of water, and the aqueous solution is agitated with chloroform. After evaporating the chloroform, the residue is recrystallized from ligroin. In this manner there is obtained 6-methoxy-5-cyano-3,4-dimethyl-pyridazine in the form of white crystals melting at 93–94° C. The yield is 52%.

The 6-chloro-5-cyano-3,4-dimethyl-pyridazine used as starting material can be prepared as follows:

20 parts of 6-hydroxy-5-cyano-3,4-dimethyl-pyridazine are heated for one hour in a bath at 100° C. together with 90 parts by volume of phosphorus oxychloride. The excess of phosphorus oxychloride is evaporated in vacuo, and the residue is mixed with ice water. The aqueous solution is adjusted to a pH value of 7 with a 2 N-solution of caustic soda, extracted with chloroform, and the residue from the chloroform solution is recrystallized from ligroin. 6-chloro-5-cyano-3,4-dimethyl-pyridazine is obtained in the form of white crystals melting at 81–82° C. The yield is 90%.

The 6-hydroxy-5-cyano-3,4-dimethyl-pyridazine can be prepared as follows:

40 parts of hyrazine hydrate are introduced dropwise into a solution of 90 parts of methyl cyanacetate in 450 parts by volume of ethyl alcohol while cooling with ice water. The whole is allowed to stand for one hour at room temperature and then filtered with suction to separate the cyanacetic acid hydrazide which precipitates in the form of white crystals melting at 115° C.

22 parts of diacetyl are dissolved in 150 parts by volume of ethyl alcohol and slowly mixed with 24 parts of cyanacetic acid hydrazide, whereupon the solution heats up slightly and a white crystalline precipitate is soon formed. After 2 hours, the resulting diacetyl mono-cyanacetyl hydrazone is separated by filtering with suction. The product melts at 133–134° C. after recrystallization from benzene.

2.5 parts of diacetylmono-cyanacetyl-hydrazone are introduced into a solution of 0.7 part of sodium in 50 parts by volume of ethyl alcohol, and the whole is heated for 3 hours at a bath temperature of 90° C. The mixture is filtered with suction while hot to remove impurities, the filtrate is evaporated, the residue is taken up in a small amount of water, and adjusted to a pH value of 5–6 with 2 N-hydrochloric acid. The 6-hydroxy-5-cyano-3,4-dimethyl-pyridazine precipitates out, and is again recrystallized from ethyl alcohol. There are obtained white crystals melting at 211–212° C.

*Example 2*

2.6 parts of sodium are dissolved in 150 parts by volume of ethyl alcohol and, as soon as the formation of sodium ethylate is complete, 16 parts of 6-chloro-5-cyano-3,4-dimethyl-pyridazine are added. The mixture is stirred for 3 hours at room temperature, and evaporated in vacuo, the residue is taken up in 100 parts by volume of water and the aqueous solution is extracted with chloroform. By recrystallization of the residue from the chloroform solution from petroleum ether there is obtained 6-ethoxy-5-cyano-3,4-dimethyl-pyridazine in the form of white crystals melting at 77–79° C. The yield is 63%.

*Example 3*

17 parts of 6-mercapto-5-cyano-3,4-dimethyl-pyridazine are dissolved in 50 parts by volume of a 2 N-solution of caustic soda, and 13 parts of dimethyl sulfate are slowly added in 3 portions. The whole is allowed to stand for ½ hour at room temperature, and is then rendered alkaline by the addition of a 2 N-solution of caustic soda and the mixture is extracted with chloroform. After evaporating the chloroform, the residue is recrystallized from ligroin and in this manner there is obtained 6-methyl-mercapto-5-cyano-3,4-dimethyl-pyridazine in the form of yellow crystals melting at 66–67° C. The yield is 41%.

The 6-mercapto-5-cyano-3,4-dimethyl-pyridazine used as starting material can be obtained as follows:

16.7 parts of 6-chloro-5-cyano-3,4-dimethyl-pyridazine, 8.5 parts of thiourea and 100 parts by volume of ethyl alcohol are heated for 12 hours while stirring at the boil. The whole is allowed to cool, and filtered with suction to remove the precipitated yellow crystals. On recrystallization from boiling ethyl alcohol there is obtained 6-mercapto-5-cyano-3,4-dimethyl-pyridazine in the form of yellow crystals melting at 213–214° C. The yield is 74%.

*Example 4*

1.3 parts of sodium are introduced into 150 parts by volume of isopropyl alcohol. When all of the sodium has reacted, a solution of 8 parts of 6-chloro-5-cyano-3,4-dimethyl-pyridazine in 300 parts by volume of benzene is added and the whole is stirred for 10 hours at room temperature. The reaction mass is then evaporated to dryness under reduced pressure and the residue extracted with petroleum ether. The petroleum ether is distilled off and the oil obtained is distilled in vacuo. A 30% yield of 6-isopropoxy-5-cyano-3,4-dimethyl-pyridazine of the formula

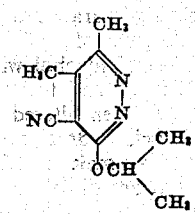

is obtained. It boils at 0.1 mm. pressure of mercury at 138–140° C.

*Example 5*

The 6-methoxy-5-cyano-3,4-dimethyl-pyridazine described in Example 1 can be made up in the usual manner as a pharmaceutical preparation of the following composition:

|  | Mg. |
|---|---|
| 6-methoxy-5-cyano-3,4-dimethyl-pyridazine | 100 |
| Lactose | 65 |
| Gelatine | 2 |
| Starch | 65 |
| Magnesium stearate | 1 |
| Talcum | 17 |
|  | 250 |

What is claimed is:

1. A compound of the formula

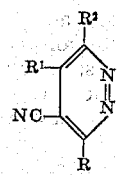

wherein R is a member selected from the group consisting of lower alkyl mercapto and lower alkoxy groups and $R^1$ and $R^2$ represent a member selected from the group consisting of hydrogen and methyl.

2. A compound of the formula

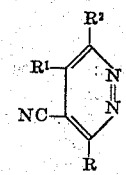

wherein R is a lower alkoxy group and $R^1$ and $R^2$ stand for lower alkyl groups.

3. A compound of the formula

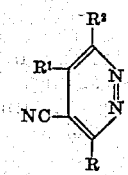

wherein R is a lower alkyl mercapto group and $R^1$ and $R^2$ stand for lower alkyl groups.

4. 6-methoxy-5-cyano-3,4-dimethyl-pyridazine.
5. 6-ethoxy-5-cyano-3,4-dimethyl-pyridazine.
6. 6-methylmercapto-5-cyano-3,4-dimethyl-pyridazine.
7. 6-isopropoxy-5-cyano-3,4-dimethyl-pyridazine.
8. 6-mercapto-5-cyano-3,4-dimethyl-pyridazine.

References Cited in the file of this patent

Sonn et al.: Liebig's Annalen 518, 290–298 (1935).